US009519349B2

United States Patent
Garvis et al.

(10) Patent No.: US 9,519,349 B2
(45) Date of Patent: Dec. 13, 2016

(54) TOUCH SCREEN INTERFACE DEVICE

(71) Applicants: Andrew W. Garvis, Sorrento, FL (US); Joseph S. Barnicki, Gulf Breeze, FL (US); Lucas J. Krocker, Altamonte Springs, FL (US); Kevin W. Palmer, Melbourne, FL (US)

(72) Inventors: Andrew W. Garvis, Sorrento, FL (US); Joseph S. Barnicki, Gulf Breeze, FL (US); Lucas J. Krocker, Altamonte Springs, FL (US); Kevin W. Palmer, Melbourne, FL (US)

(73) Assignee: Industrial Smoke & Mirrors, Inc., Orlando, FL (US)

( * ) Notice: Subject to any disclaimer, the term of this patent is extended or adjusted under 35 U.S.C. 154(b) by 180 days.

(21) Appl. No.: 14/528,479

(22) Filed: Oct. 30, 2014

(65) Prior Publication Data

US 2016/0124509 A1    May 5, 2016

(51) Int. Cl.
| | |
|---|---|
| *G06F 3/041* | (2006.01) |
| *G06F 3/01* | (2006.01) |
| *G06F 3/02* | (2006.01) |
| *G06F 3/039* | (2013.01) |
| *G06F 3/0354* | (2013.01) |

(52) U.S. Cl.
CPC ............ *G06F 3/016* (2013.01); *G06F 3/0202* (2013.01); *G06F 3/0227* (2013.01); *G06F 3/039* (2013.01); *G06F 3/03547* (2013.01); *G06F 3/041* (2013.01); *G06F 2203/04103* (2013.01); *G06F 2203/04106* (2013.01)

(58) Field of Classification Search
None
See application file for complete search history.

(56) References Cited

U.S. PATENT DOCUMENTS

| | | | | |
|---|---|---|---|---|
| 4,254,310 | A * | 3/1981 | Kirchoff | H01H 23/164 |
| | | | | 200/437 |
| 2005/0164148 | A1 | 7/2005 | Sinclair | |
| 2006/0007179 | A1* | 1/2006 | Pihlaja | G06F 3/04886 |
| | | | | 345/173 |
| 2006/0256090 | A1* | 11/2006 | Huppi | A63F 13/02 |
| | | | | 345/173 |
| 2008/0238879 | A1* | 10/2008 | Jaeger | G06F 3/03545 |
| | | | | 345/173 |
| 2009/0079705 | A1* | 3/2009 | Sizelove | B64D 11/0015 |
| | | | | 345/173 |
| 2009/0296331 | A1* | 12/2009 | Choy | G06F 1/1616 |
| | | | | 361/679.09 |

(Continued)

FOREIGN PATENT DOCUMENTS

| | | |
|---|---|---|
| GB | 2493139 A | 1/2013 |
| WO | 2013150514 A1 | 10/2013 |

*Primary Examiner* — Ilana Spar
*Assistant Examiner* — Kirk Hermann
(74) *Attorney, Agent, or Firm* — GrayRobinson, P.A.; Thomas L. Kautz (57) ABSTRACT

A mechanical interface device having a number of three-dimensional tactile actuators is mounted to the touchscreen of an electronic device having a monitor, wherein a controller coupled to the touchscreen and to the monitor is operative to cause the monitor to display graphic images and/or text in response to engagement with or movement along the surface of the touchscreen by the three-dimensional tactile actuators.

25 Claims, 7 Drawing Sheets

(56) References Cited

U.S. PATENT DOCUMENTS

| | | |
|---|---|---|
| 2010/0079403 A1 | 4/2010 | Lynch et al. |
| 2012/0118713 A1* | 5/2012 | Sadowski ............... H01H 3/42 200/11 J |
| 2013/0093702 A1 | 4/2013 | Argiro |
| 2013/0097551 A1* | 4/2013 | Hogan ............... G06F 3/04847 715/780 |
| 2014/0073409 A1 | 3/2014 | Lesley et al. |
| 2014/0139455 A1 | 5/2014 | Argiro |
| 2014/0168132 A1 | 6/2014 | Graig et al. |
| 2015/0220147 A1* | 8/2015 | King ...................... G06F 3/016 345/173 |

* cited by examiner

TOUCH SCREEN INTERFACE DEVICE

FIELD OF THE INVENTION

This invention relates to electronic devices having a monitor and a touch screen, and, more particularly, to an interface device mounted to the touchscreen having three-dimensional tactile actuators which may be operated to cause the monitor to display selected graphic displays and text.

BACKGROUND OF THE INVENTION

Touchscreens are electronic visual displays that may be controlled by a user through single or multi-touch gestures with a stylus or one or more fingers. The user may interact directly with what is displayed instead of using a mouse, touchpad or any other intermediate device. Touchscreens are commonly employed in game consoles, personal computers, tablet computers, personal digital assistants, mobile phones, smartphones, video games and similar devices.

The surface of touchscreens is smooth and users must be in a position to view what is displayed in order to interact with the electronic device. Further, while the touchscreen surface may be tapped by one's finger, for example, no tactile feedback is provided to the user other than sensing contact with a smooth surface.

In some applications, it is important to provide the user with a sense of contact with a three-dimensional element such as a switch, knob, button or other actuator in order to simulate a particular activity. For example, instruments employed in the cockpit of aircraft may include push buttons, toggle switches, potentiometers, knobs and other three-dimensional interfaces that the pilot engages in the course of flying the aircraft. Flight simulators used for training purposes must replicate these instruments, as closely as possible, to provide a realistic environment for training. Further, the presence of three-dimensional actuators allows the pilot to divert his or her eye gaze to other tasks once a particular switch, knob or the like is located and grasped. If touchscreens are employed, the pilot must continue to view the screen until actuation of the simulated switch or knob is completed which detracts from other activities that may need attention.

Flight simulators and other systems including instruments that incorporate three-dimensional actuators are known. In order to replicate graphic displays and/or text that would appear in response to actuation of a switch, knob or the like in cockpit instruments, for example, flight simulators typically include costly input/output (I/O) systems coupled between such actuators and a controller which operates a monitor or other device for the display of graphic images and/or text. In addition to the high cost and complexity of I/O systems, it is labor intensive and expensive to wire switches and other actuators to such systems.

SUMMARY OF THE INVENTION

This invention is directed to a comparatively low cost solution for simulators having three-dimensional instruments or other actuators, and for other systems employing a tactile human interface. A mechanical interface device having a number of three-dimensional tactile actuators is mounted to the touchscreen of an electronic device having a monitor, wherein a controller coupled to the touchscreen and to the monitor is operative to cause the monitor to display graphic images and/or text in response to engagement with or movement along the surface of the touchscreen by the three-dimensional tactile actuators.

In the presently preferred embodiment, a commercially available touchscreen is coupled to an LCD, plasma, LED or other flat screen monitor. The touchscreen and monitor are coupled to a controller, such as a personal computer, which incorporates commercially available software to control the monitor for the production of graphic images and text. The mechanical interface device of this invention includes an overlay in the form of a panel which may be mounted directly to the touchscreen. The overlay is provided with a number of openings in which tactile actuators are positioned, such as push buttons, rotary switches, potentiometers, toggle switches and similar three-dimensional actuators that may be grasped by a user and operated by the application of a force via the fingers or hands. Each of the actuators is preferably formed of a conductive material and incorporates one or more pads that either engage and disengage the surface of the touchscreen, or move along such surface, in response to actuation by the user. Software incorporated in the controller monitors the position of such pads upon contact with or movement along the surface of the touchscreen, and the controller, in turn, operates the monitor to produce graphic images and/or text for simulating what is meant to occur as a result of such operation of the actuator.

The interface device of this invention is solely mechanical in operation. There is no connection to the controller, electrical or otherwise, thus avoiding costly I/O systems and the attendant issues with wiring to such systems. Costs are further reduced by employing a commercially available touchscreen, monitor and software operated by the controller for generating graphic images and text on the monitor. Additionally, the overlay of the interface device of this invention may be readily removed from the touchscreen and replaced by another version having a different configuration of switches, knob, buttons and the like in order to replicate the instrument array of another flight simulator, for example, or other system in which tactile actuators are employed.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

Figure 1:
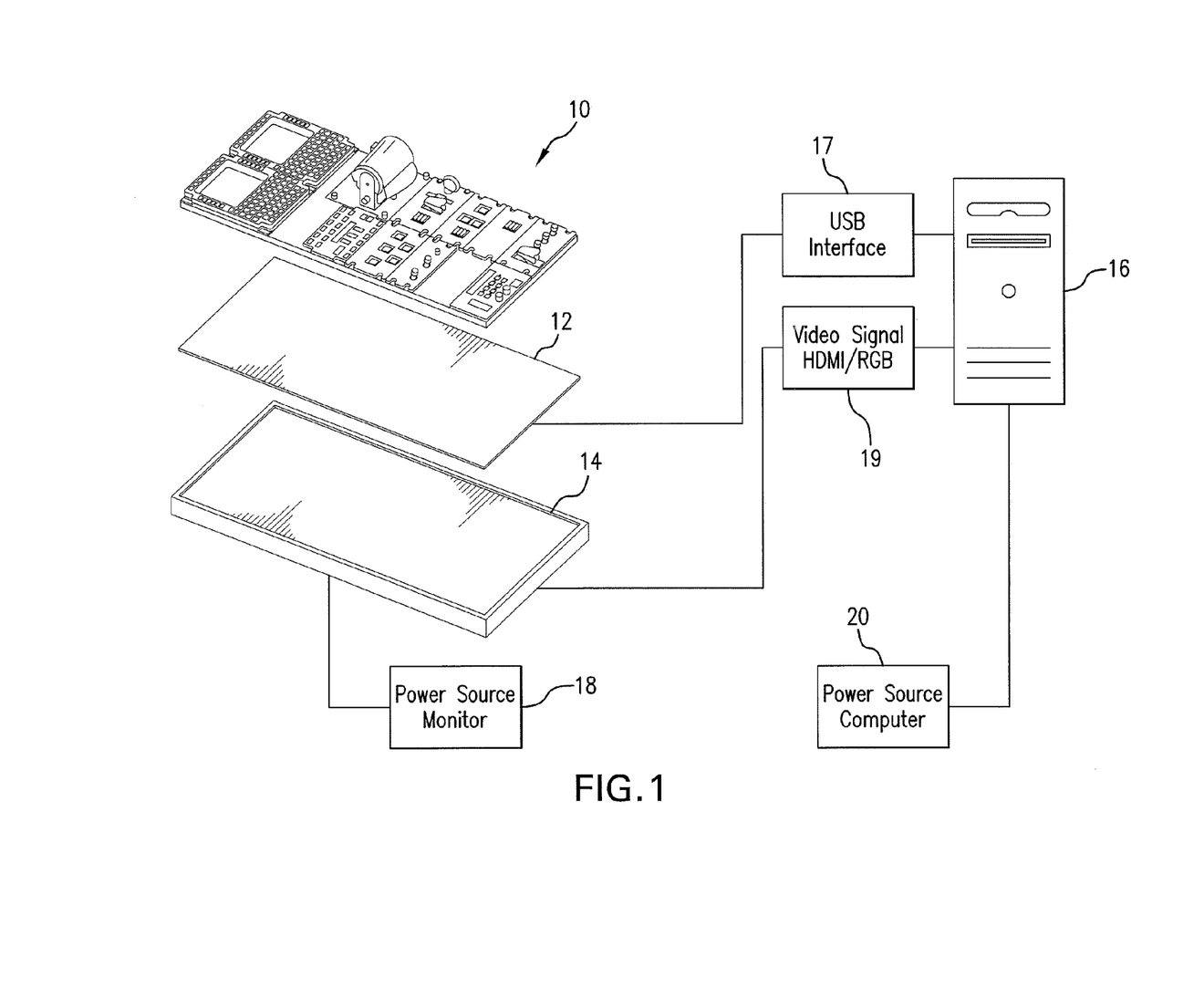
FIG. 1 is an exploded, perspective view of the mechanical interface device of this invention, including a touchscreen, monitor and controller.
Figure 2:
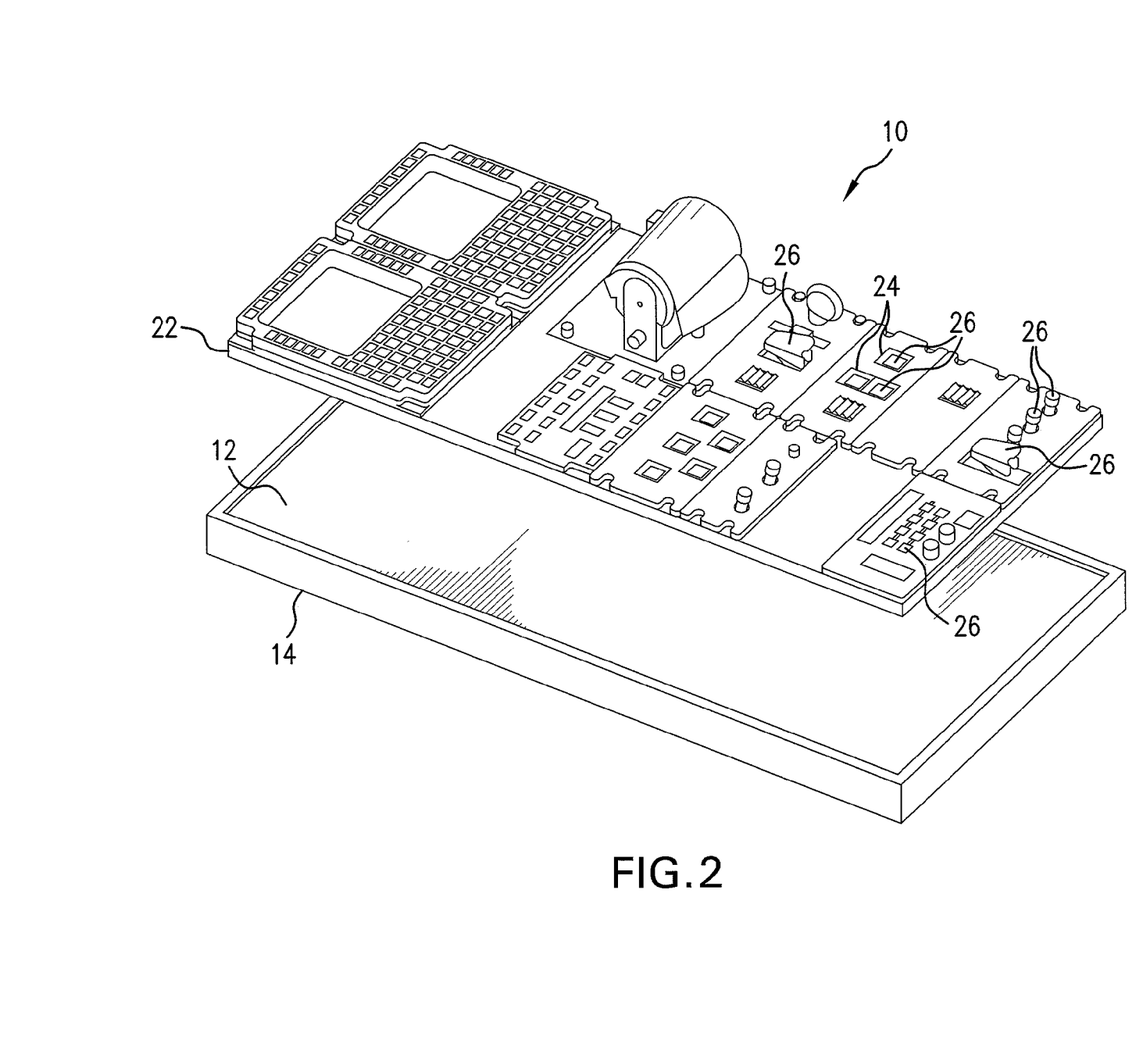
FIG. 2 is view similar to FIG. 1, except with the touchscreen and monitor attached to one another.
Figure 3:
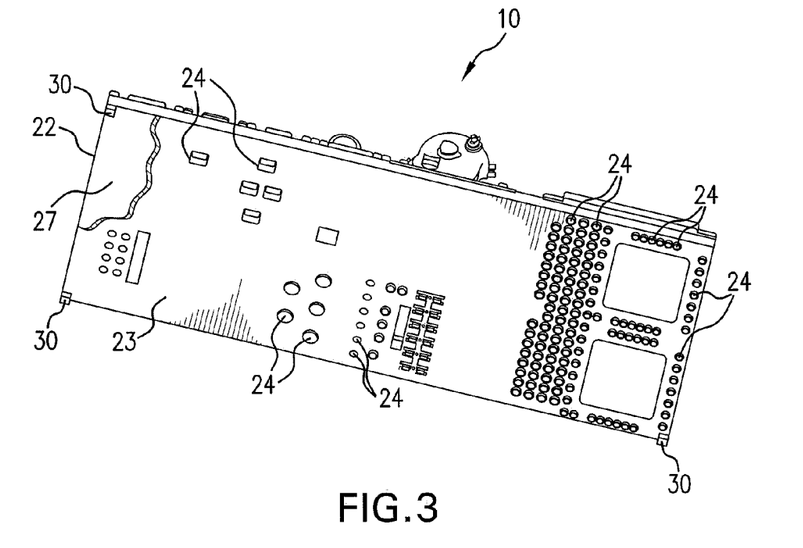
FIG. 3 is a rear view of the overlay of the interface device.

Referring initially to FIGS. 1-3, the interface device 10 of this invention is shown in combination with a touchscreen 12, a monitor 14 and a controller 16. The monitor 14 may be a liquid crystal display, plasma or light-emitting diode flat screen monitor, and the controller 16 may be a personal computer. Each of the touchscreen 12, monitor 14 and controller 16 are commercially available, the details of which form no part of this invention and are therefore not described herein. The touchscreen 12 is preferably connected to the controller 16 by a USB interface 17, and the monitor 14 may be connected to the controller by a high definition multimedia interface cable (HDMI) or an RGB (red, green, blue) cable, collectively referenced in box 19 of FIG. 1. The monitor 14 and controller 16 may have separate power supplies 18, 20, respectively, as schematically shown in FIG. 1.

The interface device 10 comprises an overlay 22, such as a board, sheet, panel or other substrate preferably made of non-conductive material, which is formed with a number of openings 24 within which various three-dimensional, tactile actuators 26 may be mounted. Different types of tactile actuators 26 that may be used with the overlay 22 are described below in connection with a discussion of FIGS. 4-16. The particular orientation, arrangement and number of tactile actuators 26 on the overlay 22 shown in FIG. 1 is for purposes of illustration only, and it should be understood that essentially any other variations may be employed and are considered within the scope of this invention. As depicted in FIG. 3, an electrically conductive plate 23 is mounted to the bottom surface 27 of the overlay 22. The conductive plate 23 is formed with the same array of openings 24 as the overlay 22 in order to mount the tactile actuators 26. A conductive pad 30 is mounted at each corner of the plate 23 to locate the overlay 22 on the touchscreen 12. Brackets, clamps or other mounting means (not shown) are employed to releasably secure the overlay 22, and ground it, to the touchscreen 12.

Figure 4:
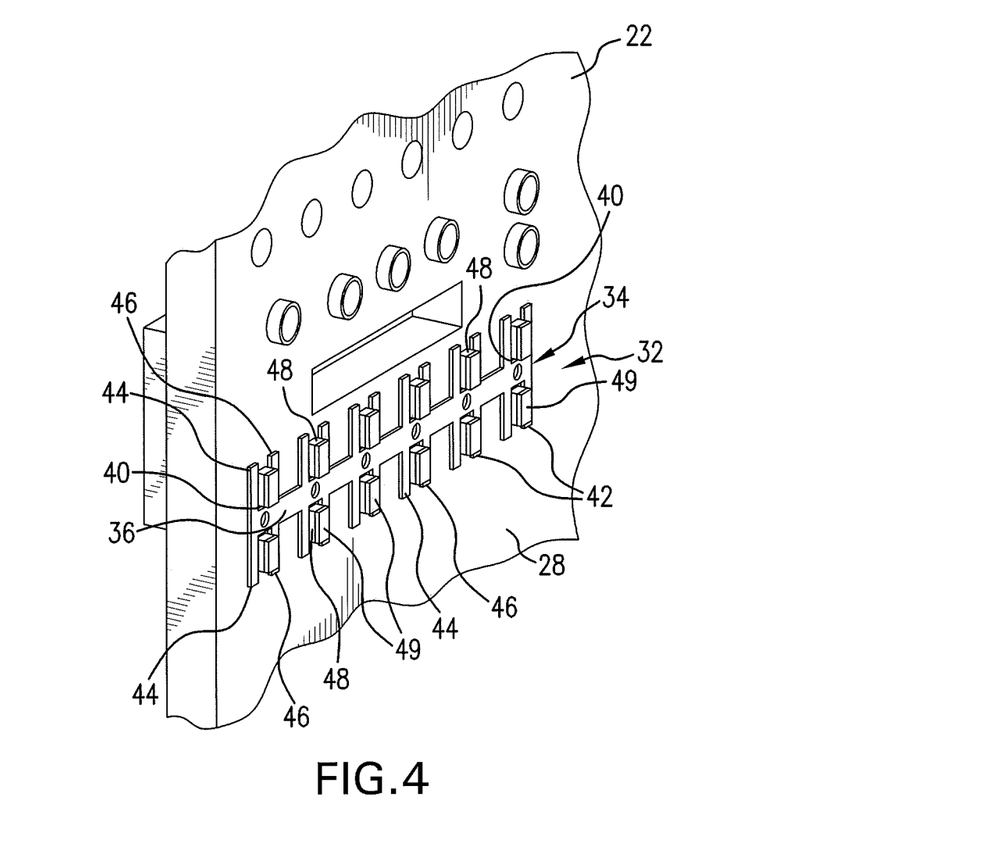
FIG. 4 is a perspective view of a push button tactile actuator attached to openings formed in the overlay of the interface device.
Figure 5:
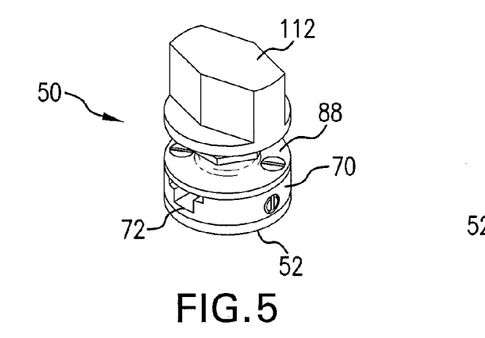
FIG. 5 is a perspective view of a rotary switch tactile actuator for use in the interface device herein.
Figure 6:
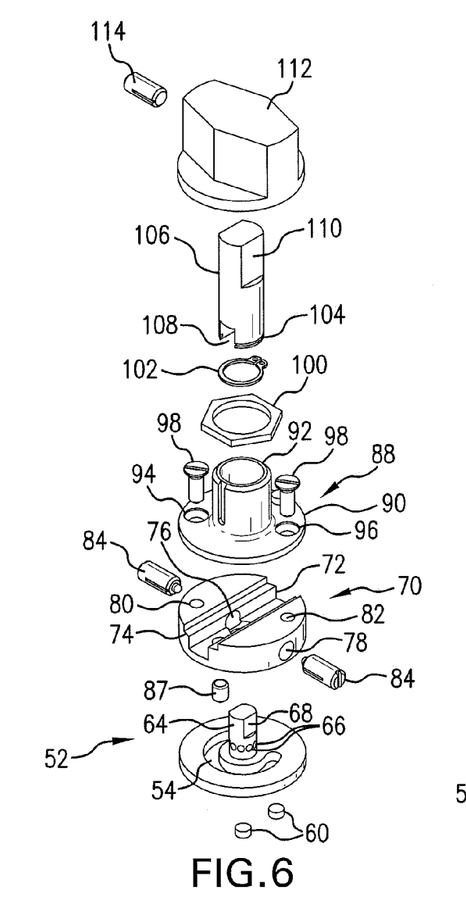
FIG. 6 is an exploded, perspective view of the rotary switch depicted in FIG. 5.
Figure 7:
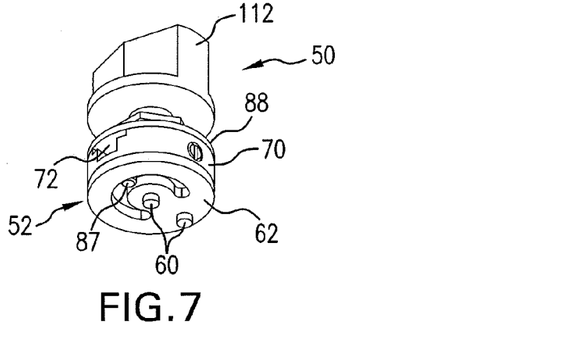
FIG. 7 is a further perspective view of the rotary switch shown in FIG. 5.
Figure 8:
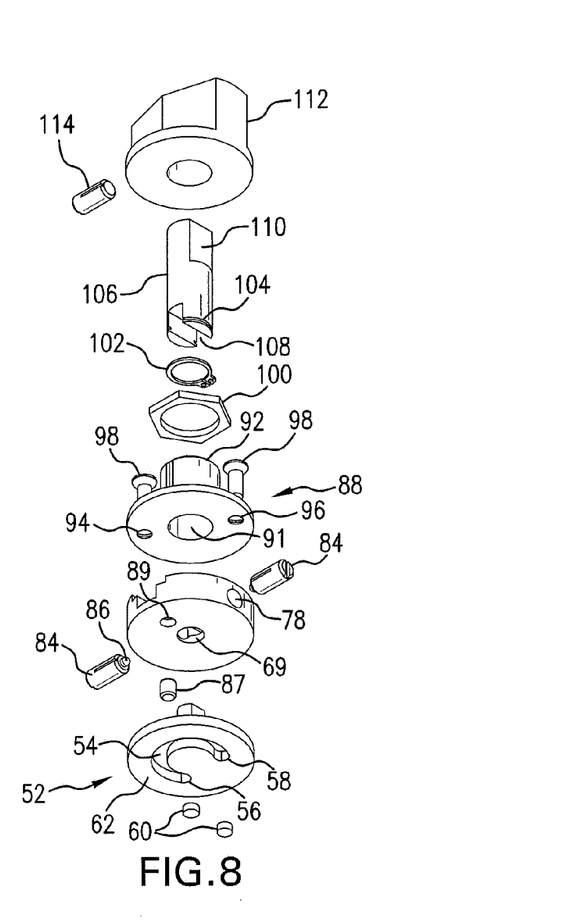
FIG. 8 is an exploded, perspective view of the rotary switch in the orientation shown in FIG. 7.
Figure 9:
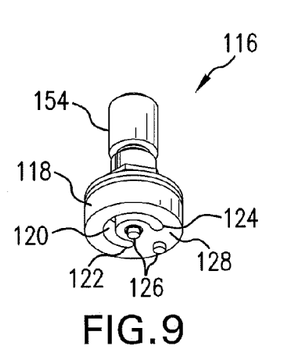
FIG. 9 is a perspective view of a tactile actuator in the form of a potentiometer for use in the mechanical interface device herein.
Figure 10:
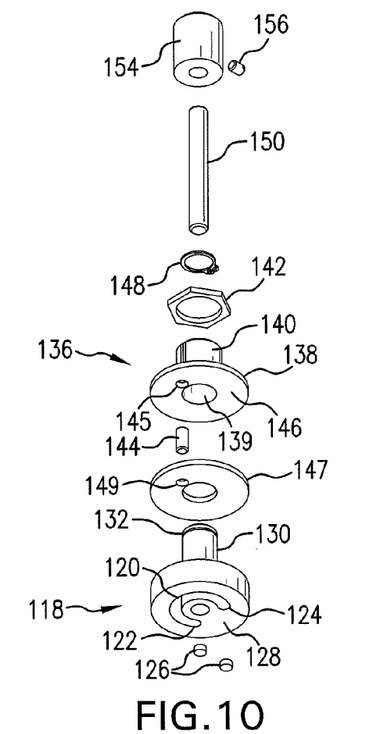
FIG. 10 is an exploded perspective view of the potentiometer in the orientation illustrated in FIG. 9.

With reference to FIG. 4, one embodiment of a tactile actuator 26 is illustrated in the form of a momentary push button assembly 32. In the illustrated embodiment, the push button assembly 32 comprises a bifurcated spring clip 34 having a central strip 36 mounted by rivets or other fasteners to the top surface 28 of the overlay 22 in between a series of spaced first openings 40 and spaced second openings 42 formed therein. A pair of spring arms 44, 46 extend from the strip 36 on either side of each of the first and second openings 40, 42, each of which connects to a button 48 having a conductive pad 49. The buttons 48 are held by the spring arms 44, 46 in a position spaced from the surface of the touchscreen 12 with the overlay 22 mounted thereto. In response to the application of a force applied to a button(s) 48, e.g. by pressing down using one's finger or a stylus, the spring arms 44, 46 deflect and allow the conductive pad 49 of each button(s) 48 to contact the surface of the touchscreen 12. The conductive pad(s) 49 remain in engagement with the touchscreen 12 for as long as pressure is applied to the button(s) 48, and then the spring arms 44, 46 return the button(s) 48 to their original position when the pressure is released. In the presently preferred embodiment, all of the components of the push button assembly 32 are formed of an electrically conductive material such as conductive plastic, and at least one of such components makes electrical contact with the conductive plate 23 mounted to the overlay 22. The conductive plastic forming the push button assembly 32 may be transparent or translucent such that light emitted from the monitor 14, if any, may shine through and illuminate the push button assembly 32.

A tactile actuator 26 in the form of a rotary switch 50 is illustrated in FIGS. 5-8. All of the components of the rotary switch 50 described below are preferably formed of an electrically conductive material such as aluminum or conductive plastic. The rotary switch 50 comprises a base 52 formed with an arcuate groove 54 having opposed ends 56, 58. One or more conductive pads 60 extend from the bottom surface 62 of the base 52 in position to contact the surface of the touchscreen 12. A lower shaft 64 extends upwardly from the base 52, and is formed with a number of circumferentially spaced detents 66 and a flat 68. The lower shaft 64 is insertable through a bore 69 formed in an adjustment plate 70 of the rotary switch 50. The bore 69 of adjustment plate 70 is intersected by a channel 72 having a seat 74. Opposed transverse bores 76, 78 are formed in the adjustment plate 70, each of which extend into the channel 72, and a pair of internally threaded, blind bores 80, 82 are formed at the top of the adjustment plate 70. A spring plunger 84 having a tip 86 is inserted within each of the transverse bores 76, 78, for purposes to become apparent below. A stop pin 87 extends outwardly from a bore 89 formed at the bottom of adjustment plate 70 which is insertable within the arcuate groove 54, as described below.

The rotary switch 50 further comprises a cover 88 having a mounting plate 90 including a central opening 91 and a hollow sleeve 92 which extends upwardly from the mounting plate 90 concentric to opening 91. The mounting plate 90 is formed with bores 94, 96 which receive fasteners such as screws 98 for insertion into the threaded bores 80, 82 of the adjustment plate 70. At least a portion of the exterior surface of the sleeve 92 is threaded (not shown) to receive a nut 100 for connecting the cover 88 to the overlay 22, as described more fully below. The rotary switch 50 additionally includes a retainer ring 102 which is received within a groove 104 formed at the base of an upper shaft 106. The lower portion of the upper shaft 106 has a cavity 108, and its upper portion is formed with a flat 110. The flat 110 of upper shaft 106 may be received within a knob 112 and retained therein by a set screw 114.

The rotary switch 50 is assembled, and mounted to the overlay 22, as follows. Initially, the lower shaft 64 of base 52 may be inserted through the bore 69 in the adjustment plate 70. The upper shaft 106 may then be inserted through the sleeve 92 and central opening 91 in the mounting plate 90 of the cover 88 into engagement with the lower shaft 64 such that the cavity 108 in the upper shaft 106 mates with the flat 68 of the lower shaft 64 and the lowermost end of the upper shaft 106 resides in the seat 74 of the channel 72 in adjustment plate 70. The retainer ring 102 may be inserted within the groove 104 of the upper shaft 106 such that it abuts the seat 74. The base 52 is mounted to the adjustment plate 70 by inserting the two spring plungers 84 into respective transverse bores 76, 78 such that the tip 86 of each spring plunger 84 extends into one of the detents 66 in the lower shaft 64. The cover 88 and adjustment plate 70 are connected to one another by extending a screw 98 through each bore 94, 96 in the mounting plate 90 of cover 88 and tightening them down within the threaded bores 80, 82 in the adjustment plate 70. This captures the retainer ring 102 between the cover 88 and adjustment plate 70, and thus secures the upper shaft 106 to the cover 88 and to the adjustment plate 70 since the retainer ring 106 engages the groove 104 in the upper shaft 106. The sleeve 92 of cover 88 may be inserted from the conductive plate 23 on the bottom surface 27 of the overlay 22, through an opening 24 therein, such that it protrudes from the upper surface 28 of the overlay 22. The nut 100 may then be tightened down along the sleeve 92 and onto the upper surface 28 of the overlay 22 to connect them together, such that the mounting plate 90 of cover 88 contacts the conductive plate 23. With the cover 88 secured to the overlay 22, the base 52, adjustment plate 70 and upper shaft 106 are effectively connected to the overlay 22, too.

In the assembled position on the overlay 22, the rotary switch 50 of this invention is positioned such that the conductive pads 60 projecting from the bottom surface 62 of the base 52 contact the surface of the touchscreen 12. The fact that the conductive pads 60 continuously contact the touchscreen 12 assists in securing the base 52 to the adjustment plate 70. The upper shaft 106 may be rotated by grasping the knob 112 and turning it in a clockwise or counterclockwise direction, which, in turn, causes the base 52 to correspondingly rotate due to the connection between the upper and lower shafts 106, 64 described above. Rotation of the lower shaft 64 with respective to the fixed adjustment plate 70 causes the spring-loaded tip 86 of each spring plunger 84 to disengage one of the detents 66 in the lower shaft 64 and enter an adjacent detent 66. The user is thus provided with the tactile sense that the rotary switch 50 has discrete positions of adjustment, in both the clockwise and counterclockwise directions, as the spring plungers 84 engage and disengage adjacent detents 66. As noted above, the stop pin 87 projecting from the bottom of the adjustment plate 70 extends into the arcuate groove 54 formed in the base 52. Rotation of the base 52 in one direction is limited by engagement of the stop pin 87 with the end 56 of arcuate groove 54, and in the opposite direction by engagement with its end 58. The position of the conductive pads 60 of rotary switch 50 as they move along the surface of the touchscreen 12 is monitored by the controller 16 which governs the display of graphic images and/or text on the monitor 14 dependent on the location of the conductive pads 60.

Referring now to FIGS. 9-12, a tactile actuator 26 in the form of a potentiometer 116 is illustrated. All of the components of the potentiometer 116 described below are preferably formed of an electrically conductive material such as aluminum or conductive plastic. The potentiometer 116 comprises a rotary base 118 formed with an arcuate groove 120 having opposed ends 122, 124. One or more conductive pads 126 extend from the bottom surface 128 of the rotary base 118 in position to contact the surface of the touchscreen 12. A lower shaft 130 extends upwardly from the rotary base 118, and is formed with a retainer ring groove 132 at its upper end. The lower shaft 130 is formed with an axial bore 134.

The potentiometer 116 of this invention further comprises a cover 136 having a mounting plate 138 formed with a central opening 139 and a hollow sleeve 140 which extends upwardly from the mounting plate 138 concentric to opening 139. At least a portion of the exterior surface of the sleeve 140 is threaded to receive a nut 142 for connecting the cover 136 to the overlay 22, as described more fully below. A stop pin 144 extends outwardly from a bore 145 in the bottom surface 146 of mounting plate 138 for insertion into the arcuate groove of rotary base 118 as discussed below. Further, a felt washer 147 or other low friction ring having a bore 149 fits over the sleeve 140 and is interposed between the rotary base 118 and cover 136 with the potentiometer 116 assembled. The upper portion of the potentiometer 116 includes a retainer ring 148 and an upper shaft 150 having an upper end formed with a flat 152 which is insertable within a knob 154 where it is held in place by a set screw 156.

Figure 11:
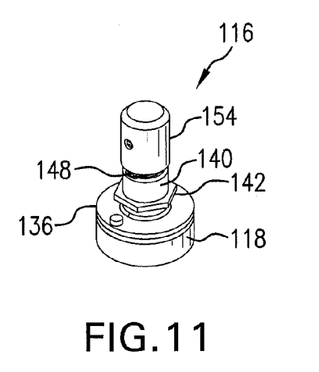
FIG. 11 is a further perspective view of the potentiometer illustrated in FIG. 9.
Figure 12:
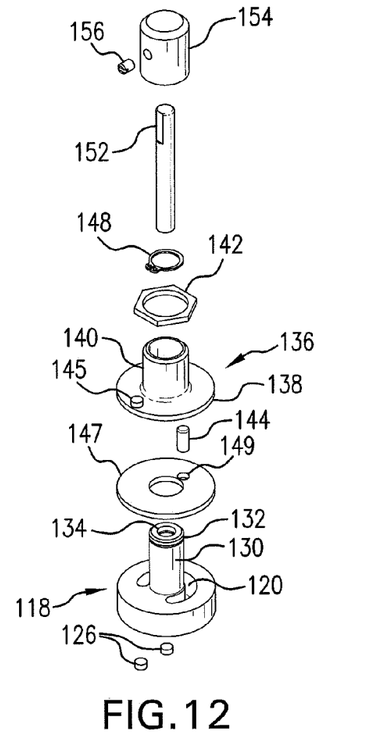
FIG. 12 is an exploded perspective view of the potentiometer in the orientation depicted in FIG. 11.
Figure 13:
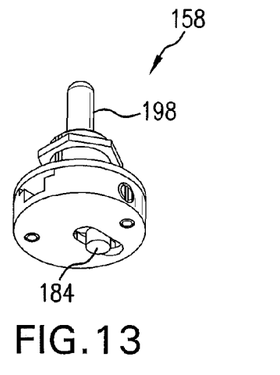
FIG. 13 is a perspective view of a tactile actuator in the form of a toggle switch for use in the interface device herein.
Figure 14:
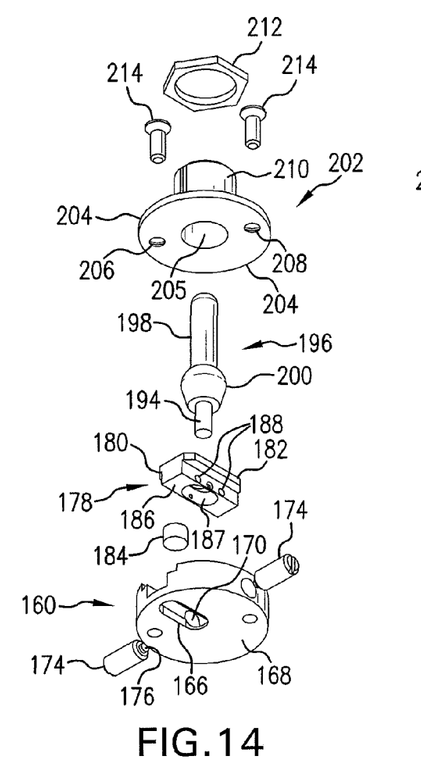
FIG. 14 is an exploded perspective view of the toggle switch in the orientation illustrated in FIG. 13.
Figure 15:
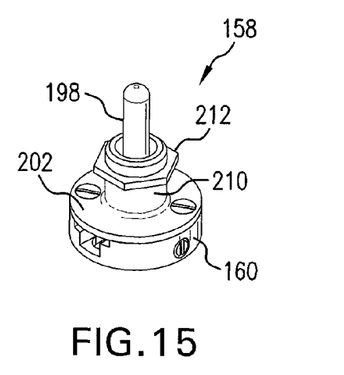
FIG. 15 is a further perspective view of the toggle switch shown in FIG. 13.
Figure 16:
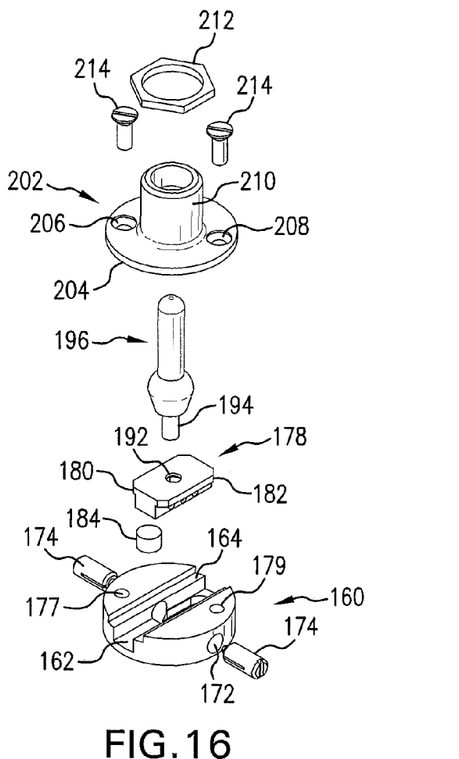
FIG. 16 is an exploded, perspective view of the toggle switch in the orientation shown in FIG. 15.

The potentiometer 116 may be assembled and mounted to the overlay 22 as follows. The upper shaft 150 may be inserted through the retainer ring 148, the nut 142, the sleeve 140 and central opening 139 of cover 136, the washer 147 and then into the axial bore 134 in the lower shaft 130 where it is press fit in place. The rotary base 118 may be moved into engagement with the bottom surface 146 of the mounting plate 138 of cover 136, sandwiching washer 147 between them, such that the stop pin 144 extending from the mounting plate 138 of the cover 136 passes through the bore 149 in the washer 147 and enters the arcuate groove 120 in the rotary base 118. The sleeve 140 of cover 136 may then be inserted from the conductive plate 23 mounted on the bottom surface 27 of the overlay 22, through an opening 24 therein, such that it protrudes from the upper surface 28 of the overlay 22. The nut 142 may then be tightened down along the sleeve 140 and onto the upper surface 28 of the overlay 22 to connect them together, such that the mounting plate 138 of cover 136 contacts the conductive plate 23. With the cover 136 secured to the overlay 22, the retainer ring 148 may be inserted into the retainer ring groove 132 at the top end of the lower shaft 130 in order to mount the rotary base 118 to the cover 136, and, in turn, the overlay 22. As best seen in FIG. 11, when connected to the lower shaft 130, the retainer ring 148 rests atop the top end of the sleeve 140 of cover 136.

In the assembled position on the overlay 22, the potentiometer 116 of this invention is positioned such that the conductive pads 126 projecting from the bottom surface 128 of the rotary base 118 maintain continuous contact with the surface of the touchscreen 12. The upper shaft 150 may be rotated by grasping the knob 154 and turning it in a clockwise or counterclockwise direction, which, in turn, causes the rotary base 118 to correspondingly rotate due to the connection between the upper and lower shafts 150, 130 described above. Unlike the rotary switch 50, the potentiometer 116 shown in the embodiment of FIGS. 9-12 may be adjusted to position its conductive pads 126 at essentially any position along the surface of touchscreen 12 within the limits permitted by the arcuate groove 120 in the rotary base 118. As noted above, the stop pin 144 projecting from the bottom surface 146 of the cover 136 extends into the arcuate groove 120 formed in the rotary base 118. Rotation of the rotary base 118 in one direction is limited by engagement of the stop pin 144 with the end 122 of arcuate groove 120, and in the opposite direction by engagement with its end 124. In an alternative embodiment, the stop pin 144 may be removed thus allowing the rotary base 118 to turn without restriction in either the clockwise or counterclockwise direction, thus simulating the operation of a rotary encoder switch. In both embodiments noted above, the position of the conductive pads 126 of potentiometer 116 (or rotary encoder switch) is monitored by the controller 16 which governs the display of graphic images and/or text on the monitor 14 dependent on the location of the conductive pads 126.

A still further embodiment of a tactile actuator 26 according to this invention is illustrated in FIGS. 13-16 which depict a toggle switch 158. All of the components of the toggle switch 158 described below are preferably formed of an electrically conductive material such as aluminum or conductive plastic. Preferably, the toggle switch 158 comprises a lower body 160 formed with a channel 162 having a seat 164. The channel 162 is intersected by an elongated opening 166 which extends to the bottom surface 168 of lower body 160. Opposed transverse bores 170, 172 are formed in the lower body 160, each of which extend into the channel 162. A spring plunger 174 having a tip 176 is inserted within each of the transverse bores 170, 172, for purposes to become apparent below. The top of the lower body 160 is formed with a pair of internally threaded, blind bores 177, 179.

The channel 162 of lower body 160 receives a slide block 178 having opposed, outwardly projecting arms 180, 182 extending from its top end, a conductive pad 184 mounted to its bottom surface 186, a central opening 187, and, a number of spaced detents 188 along each side wall 190 (one of which is shown in the drawings). The slide block 178 is formed with a bore 192 at its top surface which receives the lower portion 194 of a toggle lever 196, for purposes to become apparent below. An upper portion 198 of the toggle lever 196 is separated from its lower portion 194 by an enlarged lever body 200. The upper body 202 of the toggle switch 158 includes a mounting plate 204 formed with a central opening 205, holes 206, 208, and a hollow sleeve 210 extending outwardly from the mounting plate 204 concentric to opening 205. At least a portion of the exterior surface of the sleeve 210 is threaded to receive a nut 212.

The toggle switch 158 may be assembled and mounted to the overlay 22 as follows. The slide block 178 may be positioned within the channel 162 of the lower body 160 such that its slide arms 180, 182 engage the seat 164 in the channel 162 and the conductive pad 184 mounted to the bottom surface 186 of slide block 178 passes through the elongated opening 166 in the lower body 160 in position to contact the surface of the touchscreen 12. With the slide block 178 in this position, a spring plunger 174 may be inserted into each of the transverse bores 170, 172 formed in the lower body 160 such that the tip 176 of each spring plunger 174 extends into one of the detents 188 in the slide block 178. The toggle lever 196 is connected to the slide block 178 by press fitting its lower portion 194 into the bore 192 in the slide block 178. The upper body 202 is mounted to the lower body 160 by fasteners 214 each inserted through one of the holes 206, 208 in the mounting plate 204 of upper body 202 and then tightened down in the threaded bores 177, 179 in the lower body 160. The entire assembly may be mounted to the overlay 22 by inserting the sleeve 210 of the upper body 202 from the conductive plate 23 mounted to the bottom surface 27 of the overlay 22, through an opening 24 therein, such that it protrudes from the upper surface 28 of the overlay 22. The nut 212 may then be tightened down along the sleeve 210 and onto the upper surface 28 of the overlay 22 to connect them together, such that the mounting plate 204 of the upper body 202 contacts the conductive plate 23.

In the assembled position on the overlay 22, the toggle switch 158 of this invention is positioned such that the conductive pad 184 carried by the slide block 178 and projecting from the bottom surface 168 of the lower body 160 continuously contacts the surface of the touchscreen 12. The upper portion 198 of the toggle lever 196 may be grasped and moved in a lateral direction, which, in turn, causes the slide block 178 to travel laterally along the channel 162 in the lower body 160, e.g. the slide arms 180, 182 slide along the seat 164 of channel 162 in response to corresponding movement of the upper portion 198 of toggle lever 196. Such lateral motion of the slide block 178 with respect to the lower body 160, which is mounted in a fixed position to the upper body 202 and overlay 22 by fasteners 214, causes the tip 176 of each spring plunger 174 to disengage one of the detents 188 in the slide block 178 and enter an adjacent detent 188. The user is thus provided with the tactile sense that the toggle switch 158 has discrete positions of adjustment, in the lateral direction, as the tip 176 of spring plungers 174 engage and disengage adjacent detents 188. The extent of motion of the toggle lever 196 in the lateral direction is limited by the diameter of the hollow sleeve 210 and the central opening 205 in the mounting plate 204 of upper body 202 within which the toggle lever 196 is received. The position of the conductive pad 184 extending from the slide block 178 and through the lower body 160 onto the surface of the touchscreen is monitored by the controller 16 which governs the display of graphic images and/or text on the monitor 14 dependent on the location of the conductive pad 184.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. Apparatus for interfacing with the touchscreen of an electronic device, comprising:

an overlay adapted to mount over the touchscreen of the electronic device, said overlay being formed of an electrically non-conductive material with a number of openings;

an electrically conductive plate mounted to said overlay, said electrically conductive plate being formed with said openings;

a number of tactile actuators each mounted to said overlay and coupled to said electrically conductive plate at one of said openings, each of said tactile actuators having a first end which projects outwardly from said overlay in position to be manipulated by a user of the apparatus and a second end which mounts at least one conductive pad, said at least one conductive pad of each tactile actuator being movable into engagement and disengagement with the surface of the touchscreen, or being in continuous engagement with and movable along the surface of the touchscreen, in response to manipulation of said first end of a respective tactile actuator by the user of the apparatus.

2. The apparatus of claim 1 in which each of said tactile actuators is formed of an electrically conductive material, each of said tactile actuators being connected to said electrically conductive plate.

3. The apparatus of claim 1 in which at least one of said tactile actuators is a push button assembly comprising a spring clip mounted to said overlay, said spring clip having at least one button with a first end protruding through one of said openings in position to be depressed by a user and a second end including a conductive pad, said conductive pad being movable into contact with the touchscreen of the electronic device in response to a force applied to said first end of said button, said spring clip being effective to move said conductive pad out of contact with the touchscreen upon release of said force on said button.

4. The apparatus of claim 3 in which said spring clip is bifurcated including a first portion which mounts a number of first buttons each protruding through one of said openings in said overlay, and a second portion which mounts a number of second buttons each protruding through one of said openings in said overlay.

5. The apparatus of claim 4 in which said spring clip includes a central strip, each of said first and second portions comprising a pair of spaced spring arms each connected to said central strip and to one of said first and second buttons.

6. The apparatus of claim 1 in which at least one of said tactile actuators is a rotary switch comprising:
a base having a first shaft, said base mounting at least one of said conductive pads, said first shaft being formed with a number of detents;
a second shaft coupled to said first shaft;
mounting structure connected to said first shaft and to said second shaft, said mounting structure being effective to mount said base in position such that said at least one conductive pad engages the touchscreen of the electronic device, said mounting structure being effective to mount said second shaft such that a portion thereof extends outwardly from said overlay in position to be grasped and rotated by a user, said mounting structure including at least one connector which is engageable with said detents formed in said first shaft, said second shaft being effective to rotate said first shaft and said base to selected positions relative to the touchscreen of the electronic device, said at least one connector being in engagement with one of said detents in said first shaft at each of said selected locations.

7. The apparatus of claim 6 in which said mounting structure comprises:
a cover formed with a mounting plate and a hollow sleeve, said hollow sleeve being insertable within one of said openings in said overlay;
an adjustment plate formed with a bore and with a seat, said adjustment plate being connected to said cover;
a mount engageable with said sleeve of said cover to secure said cover to said overlay;
a retainer ring, said second shaft extending through said sleeve of said cover and into contact with said seat in said adjustment plate, said retainer ring being connected to said second shaft and being sandwiched between said seat and said cover.

8. The apparatus of claim 6 in which said at least one connector comprises a spring plunger, said spring plunger being insertable within a bore formed in said adjustment plate in position for a tip of said spring plunger to engage said detents in said first shaft of said base.

9. The apparatus of claim 6 in which said base is formed with a slot having a first end and a second end, a stop pin projecting from said adjustment plate which is insertable within said slot, said base being rotatable with said second shaft between a first position in which said stop pin contacts said first end of said slot and a second position in which said stop pin contacts said second end of said slot.

10. The apparatus of claim 1 in which said tactile actuator is a potentiometer comprising:
a base having a first shaft, said base mounting said at least one conductive pad;
a second shaft connected to said first shaft;
a cover formed with a mounting plate and a hollow sleeve insertable within one of said openings in said overlay, said first shaft being insertable through said sleeve and into engagement with said second shaft;
a mount engageable with said sleeve of said cover to secure said cover to said overlay;
a retainer ring connected to said first shaft and in abutment with said sleeve.

11. The apparatus of claim 10 further including a low friction washer connected between said base and said mounting plate of said cover.

12. The apparatus of claim 10 in which said base is formed with a slot having a first end and a second end, a stop pin projecting from said mounting plate of said cover which is insertable within said slot, said base being rotatable in response to rotation of said second shaft between a first position in which said stop pin contacts said first end of said slot and a second position in which said stop pin contacts said second end of said slot.

13. The apparatus of claim 1 in which said tactile actuator is a toggle switch comprising:
a lower body formed with an opening and with a channel having a seat;
a slide block movable along said seat of said lower body, said slide block mounting said at least one conductive pad in position to extend through said opening in said lower body for engagement with the touchscreen of the electronic device, said slide block being formed with a number of detents;
a toggle lever connected to said slide block;
a cover formed with a mounting plate and a hollow sleeve insertable within one of said openings in said overlay, said cover being mounted to said overlay and being connected to said lower body, said toggle lever extending through said sleeve of said cover in position to be grasped by a user;
at least one connector coupled to said lower body in position to engage said detents in said slide block, said toggle lever being effective to move said slide block along said seat in said lower body so that said at least one conductive pad contacts a selected position along the touch screen of the electronic device, said at least one connector being in engagement with one of said detents in said slide block at each of said selected locations.

14. The apparatus of claim 13 in which said at least one connector is a spring plunger having a tip which is engageable with said detents in said slide block.

15. Apparatus for interfacing with a touchscreen coupled to the monitor of an electronic device, comprising:
an overlay adapted to mount over the touchscreen of the electronic device, said overlay being formed of an electrically non-conductive material with a number of openings;
an electrically conductive plate mounted to said overlay, said electrically conductive plate being formed with said openings;

a number of tactile actuators each mounted to said overlay and coupled to said electrically conductive plate at one of said openings, each of said tactile actuators having a first end which projects outwardly from said overlay in position to be manipulated by a user of the apparatus and a second end which mounts at least one conductive pad, said at least one conductive pad of each tactile actuator being movable into engagement and disengagement with the surface of the touchscreen, or being in continuous engagement with and movable along the surface of the touchscreen, in response to manipulation of said first end of a respective tactile actuator by the user of the apparatus;

a controller coupled to the touchscreen and to the monitor of the electronic device, said controller being effective to monitor the position of said conductive pads of said tactile sensors relative to the surface of the touchscreen of the electronic device and to control one or more of graphic images and text displayed on the monitor of the electronic device dependent on said position of said conductive pads on the surface of the touchscreen.

16. The apparatus of claim 15 in which each of said tactile actuators is formed of an electrically conductive material, each of said tactile actuators being connected to said electrically conductive plate.

17. The apparatus of claim 15 in which at least one of said tactile actuators is a push button assembly comprising a spring clip mounted to said overlay, said spring clip having at least one button with a first end protruding through one of said openings in position to be depressed by a user and a second end including a conductive pad, said conductive pad being movable into contact with the touchscreen of the electronic device in response to a force applied to said first end of said button, said spring clip being effective to move said conductive pad out of contact with the touchscreen upon release of said force on said button.

18. The apparatus of claim 15 in which at least one of said tactile actuators is a rotary switch comprising:
  a base having a first shaft, said base mounting at least one of said conductive pads, said first shaft being formed with a number of detents;
  a second shaft coupled to said first shaft;
  mounting structure connected to said first shaft and to said second shaft, said mounting structure being effective to mount said base in position such that said at least one conductive pad engages the touchscreen of the electronic device, said mounting structure being effective to mount said second shaft such that a portion thereof extends outwardly from said overlay in position to be grasped and rotated by a user, said mounting structure including at least one connector which is engageable with said detents formed in said first shaft, said second shaft being effective to rotate said first shaft and said base to selected positions relative to the touchscreen of the electronic device, said at least one connector being in engagement with one of said detents in said first shaft at each of said selected locations.

19. The apparatus of claim 15 in which said tactile actuator is a potentiometer comprising:
  a base having a first shaft, said base mounting said at least one conductive pad;
  a second shaft connected to said first shaft;
  a cover formed with a mounting plate and a hollow sleeve insertable within one of said openings in said overlay, said first shaft being insertable through said sleeve and into engagement with said second shaft;
  a mount engageable with said sleeve of said cover to secure said cover to said overlay;
  a retainer ring connected to said first shaft and in abutment with said sleeve.

20. The apparatus of claim 15 in which said tactile actuator is a toggle switch comprising:
  a lower body formed with an opening and with a channel having a seat;
  a slide block movable along said seat of said lower body, said slide block mounting said at least one conductive pad in position to extend through said opening in said lower body for engagement with the touchscreen of the electronic device, said slide block being formed with a number of spaced detents;
  a toggle lever connected to said slide block;
  a cover formed with a mounting plate and a hollow sleeve insertable within one of said openings in said overlay, said cover being mounted to said overlay and being connected to said lower body, said toggle lever extending through said sleeve of said cover in position to be grasped by a user;
  at least one connector coupled to said lower body in position to engage said detents in said slide block, said toggle lever being effective to move said slide block along said seat in said lower body so that said at least one conductive pad contacts a selected position along the touch screen of the electronic device, said at least one connector being in engagement with one of said detents in said slide block at each of said selected locations.

21. Apparatus for display of graphic images and text in response to tactile input, comprising:
  a monitor capable of displaying graphic images and text;
  a touchscreen coupled to said monitor, said touchscreen being effective in response to contact with it its surface to cause said monitor to display selected graphic images and/or text;
  an interface device, comprising:
    (i) an overlay mounted over said touchscreen, said overlay being formed of an electrically non-conductive material with a number of openings;
    (ii) an electrically conductive plate mounted to said overlay, said electrically conductive plate being formed with said openings;
    (iii) a number of tactile actuators each mounted to said overlay and coupled to said electrically conductive plate at one of said openings, each of said tactile actuators having a first end which projects outwardly from said overlay in position to be manipulated by a user of the apparatus and a second end which mounts at least one conductive pad, said at least one conductive pad of each tactile actuator being movable into engagement and disengagement with the surface of the touchscreen, or being in continuous engagement with and movable along the surface of the touchscreen, in response to manipulation of said first end of a respective tactile actuator by the user of the apparatus;
  a controller coupled to the touchscreen and to the monitor of the electronic device, said controller being effective to monitor the position of said conductive pads of said tactile sensors relative to the surface of the touchscreen of the electronic device and to control one or more of graphic images and text displayed on the monitor of the electronic device dependent on said position of said conductive pads on the surface of the touchscreen.

22. The apparatus of claim 21 in which at least one of said tactile actuators is a push button assembly comprising a spring clip mounted to said overlay, said spring clip having at least one button with a first end protruding through one of said openings in position to be depressed by a user and a second end including a conductive pad, said conductive pad being movable into contact with the touchscreen of the electronic device in response to a force applied to said first end of said button, said spring clip being effective to move said conductive pad out of contact with the touchscreen upon release of said force on said button.

23. The apparatus of claim 21 in which at least one of said tactile actuators is a rotary switch comprising:
   a base having a first shaft, said base mounting at least one of said conductive pads, said first shaft being formed with a number of detents;
   a second shaft coupled to said first shaft;
   mounting structure connected to said first shaft and to said second shaft, said mounting structure being effective to mount said base in position such that said at least one conductive pad engages the touchscreen of the electronic device, said mounting structure being effective to mount said second shaft such that a portion thereof extends outwardly from said overlay in position to be grasped and rotated by a user, said mounting structure including at least one connector which is engageable with said detents formed in said first shaft, said second shaft being effective to rotate said first shaft and said base to selected positions relative to the touchscreen of the electronic device, said at least one connector being in engagement with one of said detents in said first shaft at each of said selected locations.

24. The apparatus of claim 21 in which said tactile actuator is a potentiometer comprising:
   a base having a first shaft, said base mounting said at least one conductive pad;
   a second shaft connected to said first shaft;
   a cover formed with a mounting plate and a hollow sleeve insertable within one of said openings in said overlay, said first shaft being insertable through said sleeve and into engagement with said second shaft;
   a mount engageable with said sleeve of said cover to secure said cover to said overlay;
   a retainer ring connected to said first shaft and in abutment with said sleeve.

25. The apparatus of claim 21 in which said tactile actuator is a toggle switch comprising:
   a lower body formed with an opening and with a channel having a seat;
   a slide block movable along said seat of said lower body, said slide block mounting said at least one conductive pad in position to extend through said opening in said lower body for engagement with the touchscreen of the electronic device, said slide block being formed with a number of spaced detents;
   a toggle lever connected to said slide block;
   a cover formed with a mounting plate and a hollow sleeve insertable within one of said openings in said overlay, said cover being mounted to said overlay and being connected to said lower body, said toggle lever extending through said sleeve of said cover in position to be grasped by a user;
   at least one connector coupled to said lower body in position to engage said detents in said slide block, said toggle lever being effective to move said slide block along said seat in said lower body so that said at least one conductive pad contacts a selected position along the touch screen of the electronic device, said at least one connector being in engagement with one of said detents in said slide block at each of said selected locations.

* * * * *